(No Model.)

C. W. BRACKETT.
PROTRACTOR.

No. 328,281. Patented Oct. 13, 1885.

Witnesses.
Robert Everitt,
Geo. W. Rea

Inventor:
Cephas W. Brackett,
By James L. Norris,
Atty.

N. PETERS, Photo-Lithographer, Washington, D. C.

UNITED STATES PATENT OFFICE.

CEPHAS W. BRACKETT, OF JORDAN, NEW YORK.

PROTRACTOR.

SPECIFICATION forming part of Letters Patent No. 328,281, dated October 13, 1885.

Application filed August 3, 1885. Serial No. 173,417. (No model.)

*To all whom it may concern:*

Be it known that I, CEPHAS W. BRACKETT, a citizen of the United States, residing at Jordan, in the county of Onondaga and State of New York, have invented new and useful Improvements in Measuring-Instruments, of which the following is a specification.

My invention relates to that class of devices commonly used for making surface measurements, and the special purpose thereof is to provide a device which may be used either as a rolling measure or as a protractor for measuring and laying off angles, and which may be folded to diminish its bulk and enable it to be carried in the pocket.

It is also the purpose of my invention to provide a simple and inexpensive device for indicating or registering each complete revolution of the measuring-wheel, and showing the total number of revolutions made thereby.

The invention consists in the several novel features of construction and combinations of parts, hereinafter fully set forth, and definitely pointed out in the claims annexed to this specification.

Figure 1:
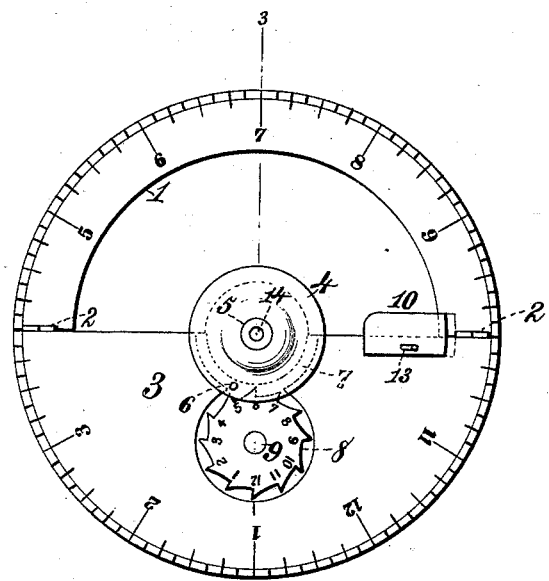
Figure 2:
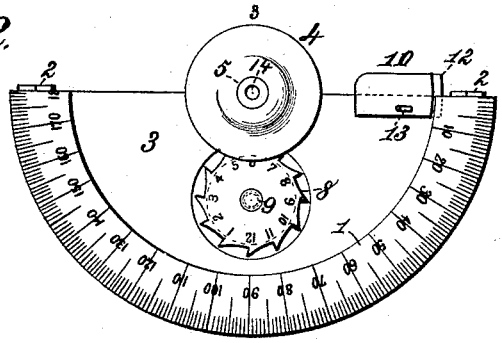
Figure 3:
Figure 4:

In the annexed drawings, Figure 1 is a front elevation showing the complete instrument. Fig. 2 is a similar view showing the device folded. Fig. 3 is a central vertical section upon the line 3 3, Fig. 1. Fig. 4 is a plan view showing the locking-plates, the upper or hinged limb of the measure being sectioned just above said plates.

In the said drawings, the reference-numeral 1 designates the semicircular plate cut out in the central portion to form a protractor, the degrees being marked thereon in the usual manner. This plate is attached by means of hinges 2 to a semicircular plate, 3, of equal radius, which may also be graduated, if desired, upon one side, and upon the opposite side thereof, as well as upon the corresponding face of the protractor 1, are inch-marks and graduations showing the fractional divisions in the manner usual in rules used for measurement. These divisional marks are all drawn radially, the distances indicated by them being measured upon the periphery of the device.

Centrally mounted upon the plate 3 are two disks, 4, which lie one on each side of the plate. In one form of construction these disks may be rigidly attached to the plate and revolve with it; and they form a convenient grasp for the thumb and finger, the central portion of each being swaged to form a nipple or projection, 5, which readily turns between the finger and thumb. When said plates are thus rigidly attached, a pin, 6, may be inserted in either one near the edge in such manner as to project very slightly above the surface of the disk. As the latter revolves this pin strikes the finger and indicates to the user that a complete revolution has been made. I may, however, attach these disks in such manner that the measuring-wheel will rotate upon an axis passing centrally through them, while the disks themselves are without rotation. In this case I swage the plate 3 in such manner as to form an annular channel or depression, 7, beneath the disk carrying the pin 6, the latter being projected through the disk so as to lie in said channel. Beneath the said disk is formed a circular recess with which the annular channel 7 intersects, and in said recess is placed a ratchet-wheel, 8, turning upon a central bearing, 9. The teeth of the ratchet lie in the path of the pin 6, and at each revolution of the measuring device one of the teeth of the ratchet will strike the pin and give movement to the wheel. By numbering the latter consecutively at each division the wheel will indicate the entire number of revolutions made by the measuring-tool. If desired, a second wheel might be added, so connected with the first that it will turn a single tooth at each complete revolution of the wheel 8. As a rule, however, a single registering-disk will be all that is required.

In order to support the hinged limb 1 when it is turned out into the same plane with the plate 3, I mount upon the latter a holding plate, 10, composed of two parts, which straddle and lie upon the edge of the plate near one of the hinged ends of the limb 1. The ends of these plates are cut away upon their adjacent faces to form a recess, 11, large enough to admit the edge of the protractor, and one of said plates is prolonged to form an end, 12, which lies against that surface of the protractor which is outermost when the parts are folded. The movement of the holding-plates is limited by a slot, 13, which is long enough to allow the shorter plate to be withdrawn from its engagement with the protractor and permit it to fold. The longer end 12, however, remains behind the protractor at all times and serves as a stop to arrest its movement when unfolded, and thereby permit the holding-plates to be slid outward without requiring the use of the eye in adjusting it.

A central perforation, 14, is formed in one or both of the disks 4 for use in determining the angles of the protractor.

I propose to make this instrument of sheet metal, and the parts may be formed, with the exception of the hinges, by striking up the same in a die. This, in connection with the simplicity of the device, greatly decreases the expense of production. By hinging the parts in the manner shown an instrument having a perimeter of twelve inches may be easily carried in the vest-pocket.

The feeler-pin 6 may be used with a solid wheel or one without a hinged protractor, and the same is true as regards the index-wheel or ratchet 4.

The ratchet 8, which is mounted on the stud or bearing 9, is provided with a light spring-disk, 8ª, which lies between the wheel and the plate 3 and has bearing upon each. This creates enough friction to prevent the disk from turning accidentally.

What I claim is—

1. A circular measuring-instrument consisting of a protractor-limb hinged upon a semicircular plate of equal radius and having a locking-plate by which the hinged limb is held in extended position, substantially as described.

2. In a circular measuring-instrument, the combination, with a protractor and a semicircular plate to which it is hinged, of a ratchet-disk having numbers upon its face, and a disk centrally pivoted on the plate and having a pin which at each revolution of the instrument engages with a tooth of the ratchet and moves it, substantially as described.

3. In a circular measuring-instrument, the combination, with a semicircular plate and a protractor hinged thereon, of a pair of holding-plates riding upon the edge of the semicircular plate and adapted to receive the edge of the protractor between their ends, the holder at the back of the protractor being of greater length than at the front, substantially as described.

In testimony whereof I affix my signature in presence of two witnesses.

CEPHAS W. BRACKETT.

Witnesses:
CHARLES WEEKS,
DANL. GUILFOYL.